United States Patent

Mulle

[11] Patent Number: 5,865,095
[45] Date of Patent: Feb. 2, 1999

[54] COFFEE GRINDER AND MAKER

[75] Inventor: Theodore Mulle, New Milford, Conn.

[73] Assignee: Conair Corporation, Stamford, Conn.

[21] Appl. No.: 821,219

[22] Filed: Mar. 20, 1997

[51] Int. Cl.[6] ................................................. A41J 31/40
[52] U.S. Cl. ................................. 99/293; 99/286; 99/304
[58] Field of Search ............................. 99/286, 293, 300, 99/304, 307, 308, 289 R; 476/433

[56] References Cited

U.S. PATENT DOCUMENTS

| | | | |
|---|---|---|---|
| 4,998,463 | 3/1991 | Precht et al. | ........................... 99/293 X |
| 5,251,541 | 10/1993 | Anson et al. | ........................... 99/307 X |
| 5,267,506 | 12/1993 | Cai | ........................... 99/293 X |

*Primary Examiner*—Reginald L. Alexander
*Attorney, Agent, or Firm*—Ohlandt, Greeley, Ruggiero & Perle

[57] ABSTRACT

A coffee maker includes a water reservoir, a heater coupled to the water reservoir, a conduit coupled to the heater, a coffee filter holder, a condensate chamber for channeling steam condensate to the water reservoir, and a fluid distributor operatively connected between the conduit, filter holder and condensate chamber. The fluid distributor channels hot water from the conduit to the filter holder and collects and condenses steam produced from the filter holder and conduit, thus preventing escape of steam into the interior of the coffee maker.

15 Claims, 6 Drawing Sheets

COFFEE GRINDER AND MAKER

FIELD OF THE INVENTION

The present invention relates to a coffee grinder and maker which collects and condenses steam resulting from a brew action and provides safety features to prevent the escape of steam and hot water.

BACKGROUND OF THE INVENTION

Many arrangements of coffee makers with and without integral coffee grinders are commercially available on the market. Such coffee makers utilize hot water to make coffee and as a consequence, generate quantities of steam. In particular, during a brew cycle, hot water is channeled into a filter unit holding a filter which, in turn, holds coffee. Steam is generated in the filter unit and often rises up and out of the coffee maker's casing. This escaping steam may result in physical injury, i.e., burns, to the user. Further, the escaping steam condenses on and around the coffee maker creating cleaning problems.

Another problem associated with a conventional coffee maker is the fact that, as a water reservoir is refilled with water and a heater is still active or hot, the water is heated by the heater and is suddenly discharged from the coffee maker. More specifically, in some circumstances, the heater remains active or hot after the brew cycle (i.e., the heater remains activated to keep coffee in a carafe warm or has not cooled down from a recent brew action). As water is poured into the water reservoir, the heater immediately heats the water and generates hot water and steam both of which are automatically channeled through the coffee maker. That is to say, the heater causes a brew action to start as the water reservoir is refilled. The resultant hot water and steam are suddenly discharged from the coffee maker and may result in injury to the user.

Accordingly, it is a fundamental object of the present invention to provide a coffee maker which collects and condenses steam generated during a brew cycle, thereby preventing steam from escaping the coffee maker.

It is a further object of the invention is to provide a coffee maker which has a safety valve for preventing the discharge of hot water and steam.

An additional object of the invention is to provide a coffee maker which has safety interlocks for preventing the discharge of hot water and steam.

SUMMARY OF THE INVENTION

A coffee maker incorporating the invention includes a water reservoir; a heater coupled to the water reservoir; a conduit coupled to the heater; a coffee filter holder; a condensate chamber for channeling steam condensate to the water reservoir, and a fluid distributor operatively connected between the conduit, filter holder and condensate chamber. The fluid distributor channels hot water from the conduit to the filter holder and collects and condenses steam produced from both the filter holder and the conduit.

The present invention provides a solution to the problem of steam accumulation during a brew action. The coffee maker includes a unique fluid distributor which is operatively connected between a filter holder, condensate chamber and hot water conduit. The fluid distributor serves two purposes. First, it distributes hot water from the conduit into the filter holder for the brew cycle.

More importantly, the fluid distributor prevents the steam generated during a brew action from escaping into the coffee maker's casing. During a brew action, steam is generated in the filter holder as hot water is channeled into the filter holder. The steam rises from the filter holder and into the fluid distributor. The fluid distributor collects and condenses the steam from the filter holder as well as any steam generated from the hot water conduit. The steam condensate is then either channeled back to the filter holder or to the water reservoir, via the condensate chamber.

The present invention further provides safety measures to protect the user from injuries that may result from contact with steam and hot water associated with the use of a coffee maker. The hot water conduit contains a safety valve that prevents the discharge of hot water and steam if the fluid distributor is not properly engaged. The safety valve is spring-loaded and is normally closed to prevent the discharge of hot water. Only when the fluid distributor is coupled to the conduit, does a protrusion mate with the safety valve, actuate the valve to an open position and allow hot water to flow into the fluid distributor.

In addition, safety interlocks are utilized to prevent the operation of the invention if the fluid distributor is not properly engaged between the filter holder, conduit and condensate chamber and if the grinder cover is not in place. As mentioned above, the fluid distributor distributes steam and hot water between different components. If not properly engaged before a brew cycle, hot water and steam may be discharged during the brew cycle. A safety interlock is employed to remedy this problem. The safety interlock includes a plunger and a normally open switch and mates with an actuator that extends from the fluid distributor. When the fluid distributor is properly engaged, the actuator contacts the respective plunger, thereby closing the respective switch and allowing the operation of the present invention. The grinder cover activates a similar interlock as described above.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
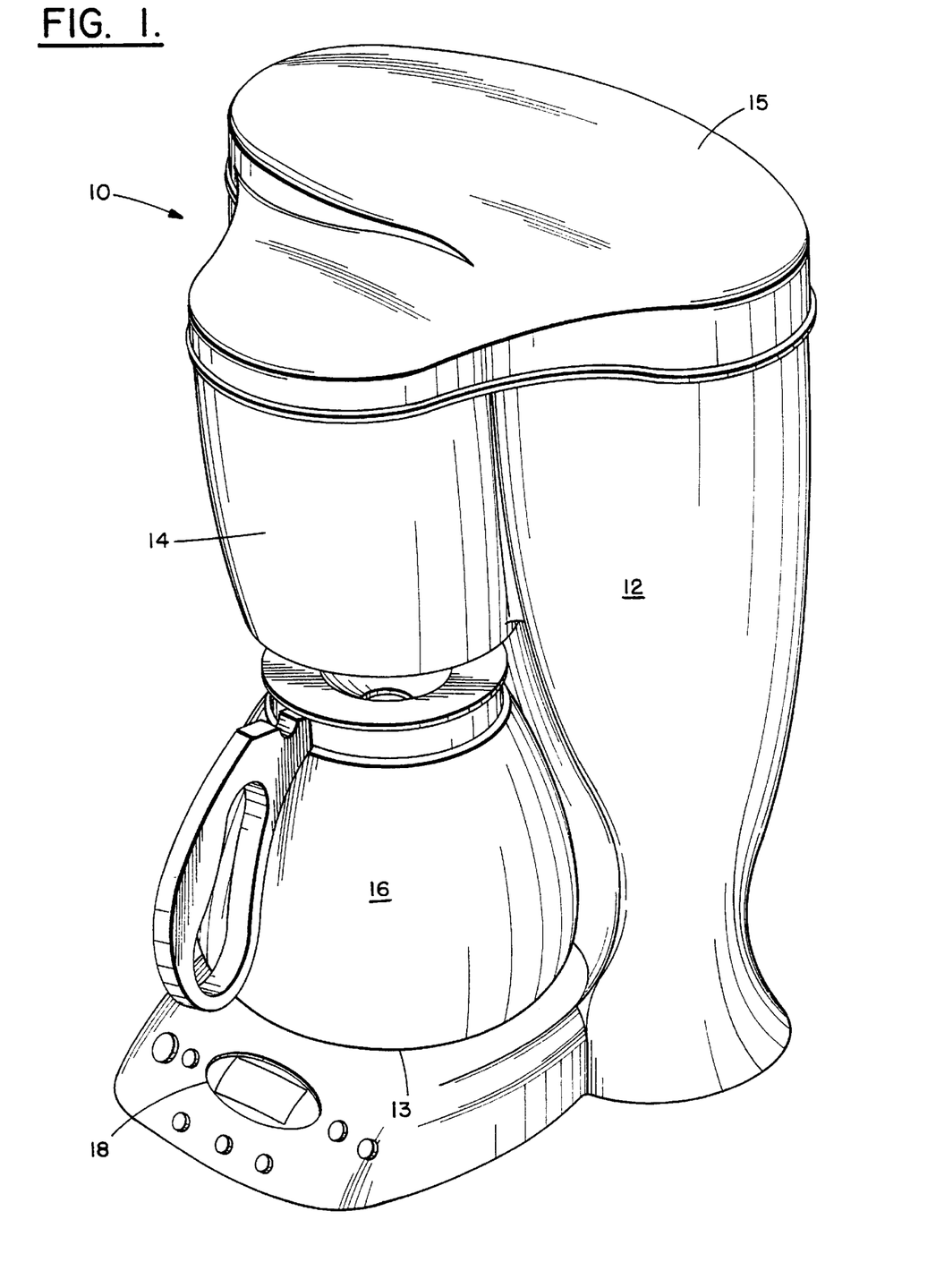
FIG. 1 is a perspective view of a preferred coffee maker and grinder incorporating the invention.

An assembled coffee maker and grinder 10, according to a preferred embodiment of the invention, is shown in FIG. 1. Coffee maker and grinder 10 comprises a casing 12 which includes a filter/grinder housing 14, a carafe receiving location 13 for a carafe 16 or other container, a lid 15 and a control panel 18 with various controls.

Figure 2:
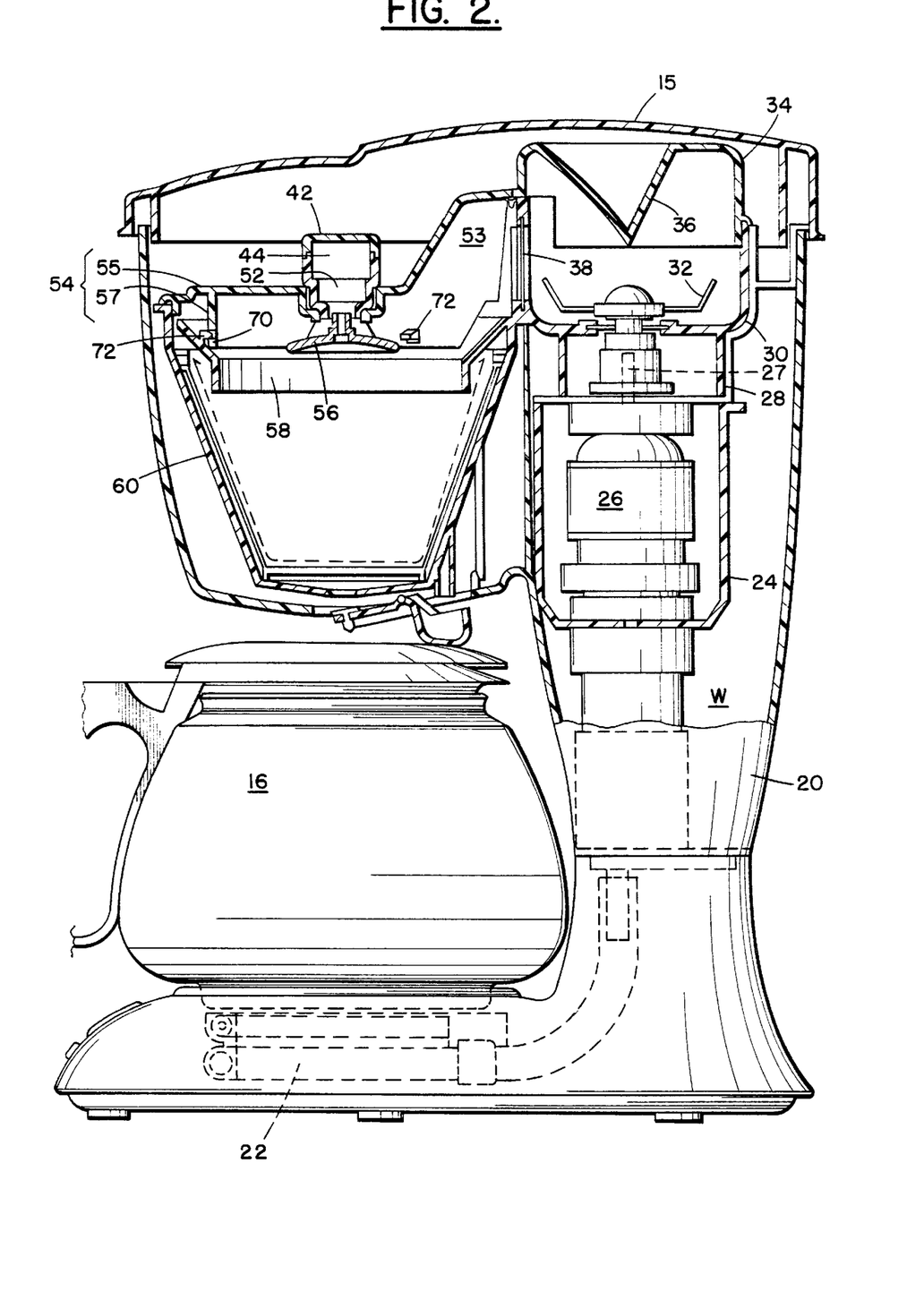
FIG. 2 is a side cross-sectional view of FIG. 1.
Figure 4:
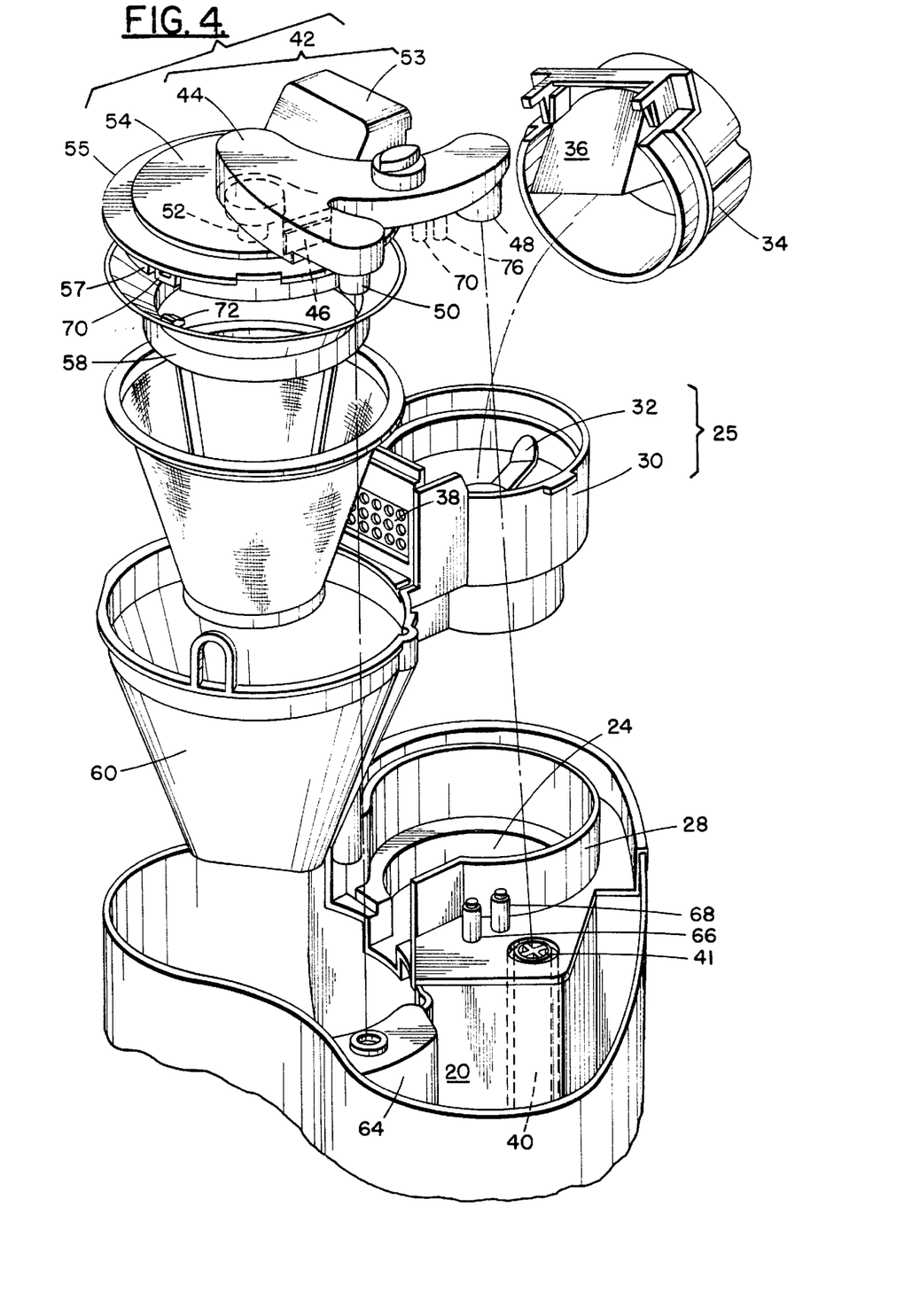
FIG. 4 is an exploded schematic top view of components in FIG. 3.

Referring to FIG. 2 in conjunction with FIG. 4, a water reservoir 20, holding water W, is a cavity formed by the interior walls of the casing 12. A conduit (not shown), connected between water reservoir 20 and a heater 22, allows water W to flow from water reservoir 20 into heater 22. A conduit 40 (FIG. 4) having a spring-loaded safety valve 41 is connected to the outlet of heater 20. When heater 22 is activated, water W from water reservoir 20 is heated in heater 22 and is channeled up through conduit 40 to safety valve 41.

Figure 7:
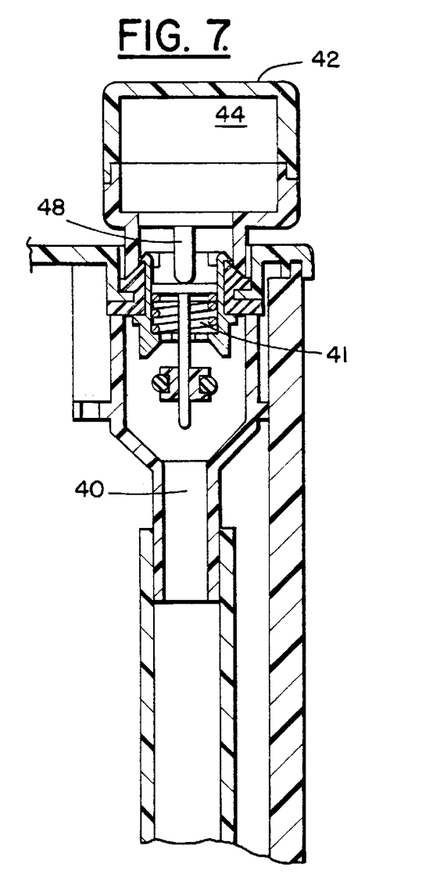
FIG. 7 is a cross-sectional view of a preferred safety valve of the present invention.
Figure 8:
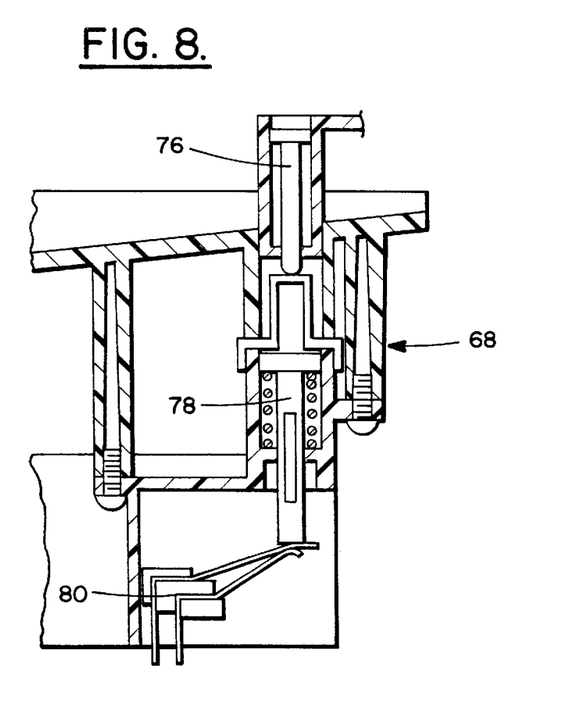

Safety valve 41 is located at the outlet of conduit 40 and is normally closed to prevent the discharge of hot water and steam from conduit 40. A fluid distributor includes a downwardly extending conduit connector 48. Conduit connector 48 has a central post (not shown) seated concentrically within an outer thin tube-shaped finger which is designed to mate with and actuate safety valve 41. When engaged (FIG. 7), conduit connector 48 activates safety valve 41 and allows hot water to flow therethrough into fluid distributor 42.

Figure 3:
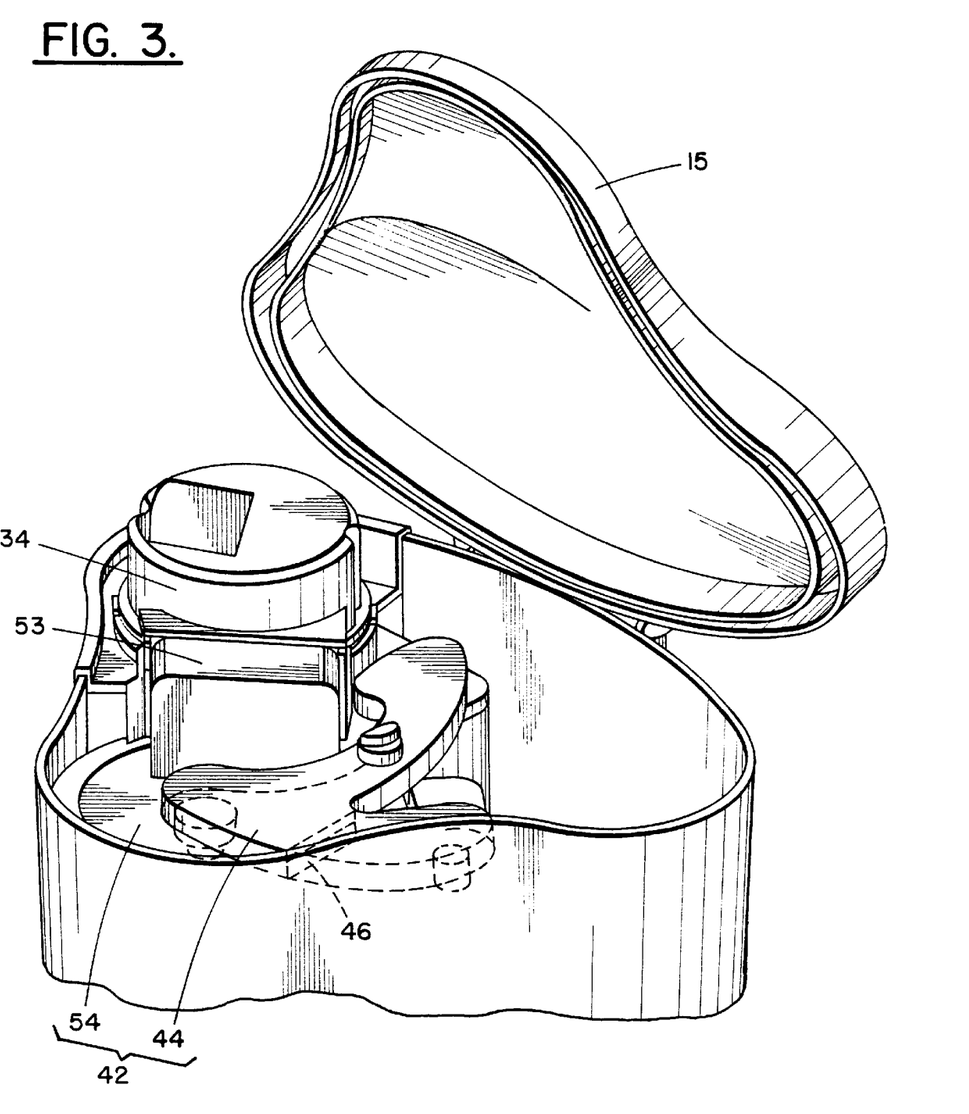
FIG. 3 is a top view of the components in FIG. 1.

FIGS. 3 and 4 respectively illustrate a top and an exploded view of fluid distributor 42 which comprises a flow chamber 44 and a coupled filter cover 54. Flow chamber 44 is a molded plastic hollow chamber. Flow chamber 44 (FIG. 4) has a filter cover connector 52, a condensate chamber connector 50 and conduit connector 48, which are respectively designed to connect operatively into filter cover 54, a condensate chamber 64 and as previously mentioned, conduit 40. Flow chamber 44 serves two primary functions. First, flow chamber 44 receives hot water from conduit 40 via conduit connector 48 and channels it to a filter holder 60, via filter cover connector 52. Second, flow chamber 44 collects and condenses steam produced from within filter holder 60 and conduit 40.

A barrier 46 is located inside flow chamber 44 and forms a fluid flow path between filter cover connector 52 and conduit connector 48. Barrier 46 extends only part of the way to the top of flow chamber 44 and thus leaves an opening for the passage of steam between filter cover connector 52 and condensate chamber connector 50. As is apparent from FIG. 4, barrier 46 forms a passage way which allows hot water from conduit 40 to flow into filter holder 60, but prevents hot water from conduit 40 from entering condensate chamber 64 via condensate chamber connector 50. The opening above the top edge of barrier 46 and the top interior surface of flow chamber 44 enables gaseous flow, in particular steam flow, between filter holder 60 and conduit 40 and condensate chamber 64.

As shown in FIGS. 2 and 4, filter cover 54 includes a circular filter lid 55 with a hole positioned in its center, an extending concentric flange 57 and an extending channel 53. Filter connector 52 (FIG. 4), a tube-shaped finger protrusion from flow chamber 44, is permanently connected into the filter lid hole. Filter cover 54 further includes a convex-shaped hanging water deflector 56 (FIG. 2) which is connected to the underside of filter lid 55. Hanging water deflector 56 is positioned under the filter lid hole with its convex side facing the filter lid hole.

Filter cover 52 is designed to fit onto a filter holder 60 and to mate with a ground coffee feed path 38 to form a seal which prevents the escape of hot water and steam from filter holder 60. Feed path 38 is a square-shaped extension from a grinder chamber 30. The function of feed path 38 and grinder chamber 30 will be discussed in more detail further below.

Filter lid 55 vertically engages the top of filter holder 60 and simultaneously, engages filter chute 58, via channel 53. As a result, when filter cover 52 is engaged onto filter holder 60 and feed path 38 (FIG. 2), hot water is allowed to flow from flow chamber 44, through filter connector 52 and into filter holder 60. The hot water entering filter holder 60 is deflected by hanging water deflector 56 and dispersed evenly throughout filter holder 60.

As hot water flows into filter holder 60 (FIG. 2), steam is generated inside filter holder 60 and is initially trapped between filter holder 60 and filter cover 54. The steam naturally rises up towards filter lid 60, through filter connector 52 and into flow chamber 44. At the same time, steam from conduit 40 also rises up into flow chamber 44 (FIG. 4). As a result, steam accumulates throughout flow chamber 44 and condenses into water, on both sides of barrier 46. The condensate is then either channeled into filter holder 60 through filter cover connector 52 (with the flowing hot water from conduit 40) or into condensate chamber 64 through condensate chamber connector 50.

Figure 5:
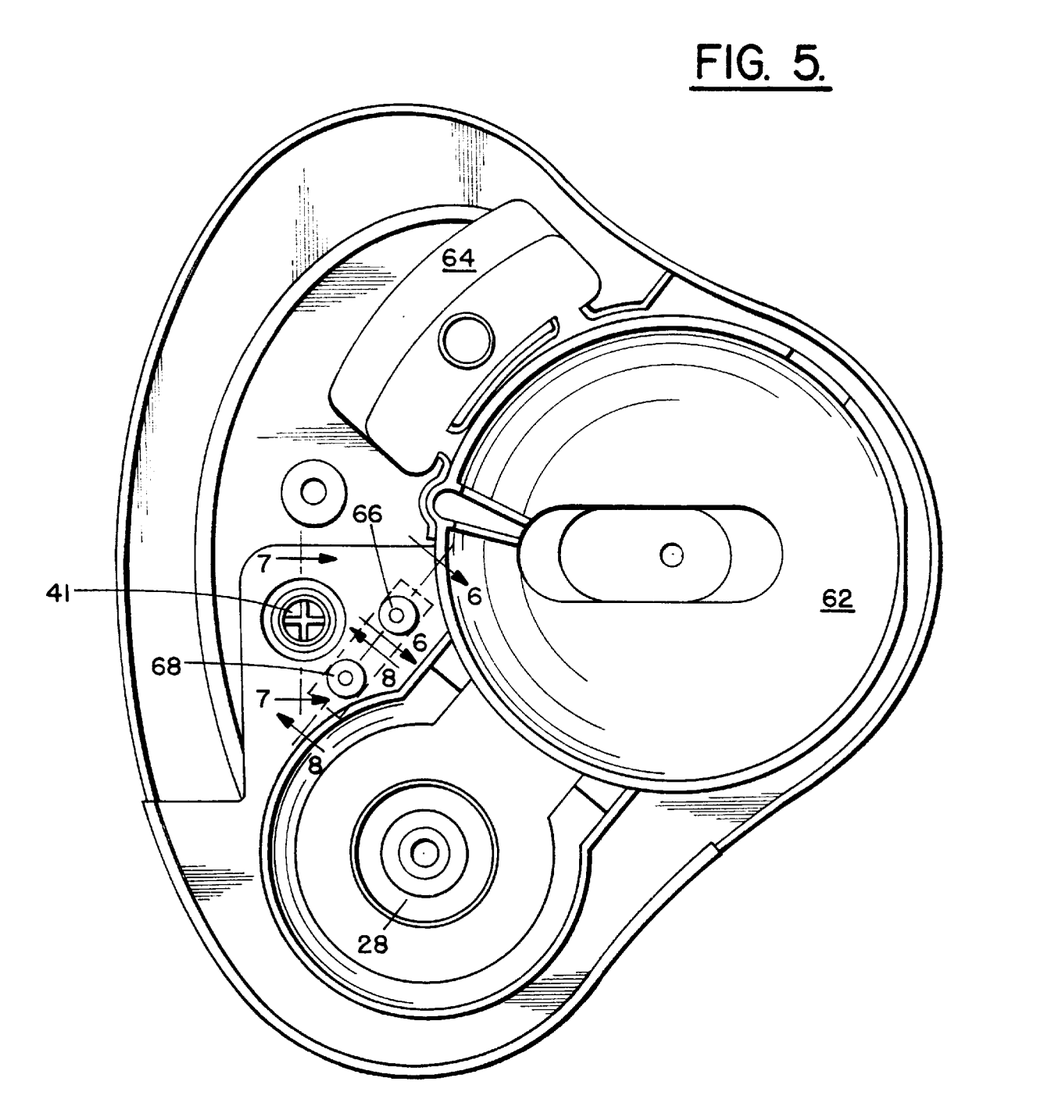
FIG. 5 is a top view of the components in FIG. 4
Figure 6:
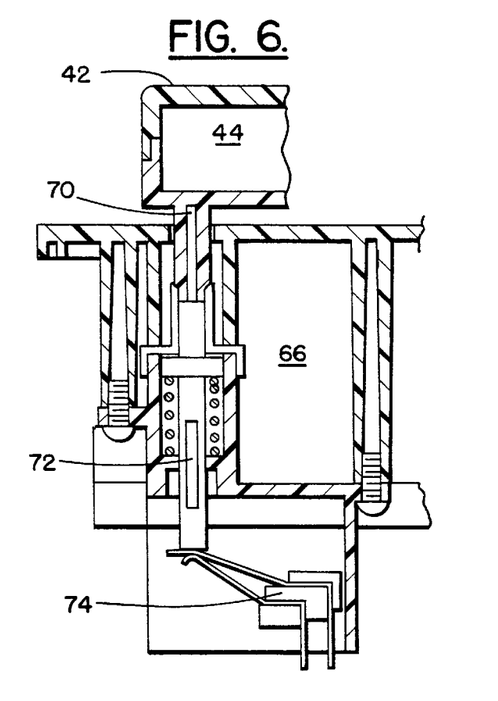
FIG. 6 and 8 are cross-sectional views of a preferred safety interlock of the present invention.

Referring to FIGS. 4 and 5, condensate chamber 64 is located inside water reservoir 20 and has a top opening located on its top and an open bottom (not shown) which opens out into water reservoir 20. Condensate chamber connector 50 (FIG. 4) is a mushroom cap-shaped extension from flow chamber 44 and is designed to mate with the top opening of condensate chamber 64. When so engaged, steam condensate is thus allowed to flow from flow chamber 44, into condensate chamber 64 and out to water reservoir 20.

The location and design of condensate chamber 64 further prevents the escape of steam entering from flow chamber 44. Condensate chamber 64 extends down the length of water reservoir 20 (not shown), such that any steam entering condensate chamber 64 through condensate chamber connector 50 is trapped therein. The trapped steam either condenses into steam condensate which flows into water reservoir 20 or naturally rises back into flow chamber 44.

It is preferred that coffee grinder and maker 10 include safety interlocks 66 and 68 which prevent a user from being injured by escaping steam and hot water. The safety interlocks are illustrated in FIGS. 4, 5, 6 and 8 herein. Safety interlocks 66 and 68 prevent the operation of coffee grinder and maker 10, unless fluid distributor 42 is properly engaged between conduit 40, filter holder 60 and condensate chamber 64. Safety interlocks 66 and 68 both include corresponding plungers 72 and 78 and respective normally open switches 74 and 80. Male tubular fingers 70 and 76 extend from flow chamber 44 and are designed to mate with corresponding safety interlocks 66 and 68. When engaged, fingers 70 and 76 respectively actuate plungers 72 and 78 which close corresponding switches 74 and 80 and therefore, allow the operation of coffee grinder and maker 10.

As shown in FIGS. 2 and 4, coffee grinder and maker 10 incorporates an integral coffee bean grinder 25 located inside casing 12. Coffee bean grinder 25 includes a motor 26, a grinder base 24, grinder chamber 30, a grinder blade 32 and a grinder lid 34. Motor 26 is located inside grinder base 24 and has a motor shaft 27 which engages grinder blade 32. Grinder base 24 is provided with a lip 28 extending upwards to form a reservoir. It permits a stable and properly aligned engagement between grinder chamber 30 and grinder base 24 and between motor shaft 27 and grinder blade 32.

Referring to FIGS. 2 and 3, grinder lid 34 is a circular lid with an extending circular flange engages and covers grinder chamber 30. When grinder lid 34 is in and motor 26 is activated, shaft 27 rotates grinder blade 32. The spinning motion of grinder blade 32 grinds coffee beans, placed in grinder holder 60, and at the same time, deflects the grounded coffee upwards towards a v-shaped deflector 36 which protrudes from the top interior surface of grinder lid 34.

As is best seen in FIG. 2, v-shaped deflector 36 is positioned to deflect ground coffee out through feed path 38 and into filter holder 60 via channel 53. Feed path 38 has a plurality of holes that only allow coffee grounds, and not chunks, to pass therethrough. Grinder chamber 30 is permanently connected to the top-side edge of filter holder 60 such that feed path 38 is positioned above filter holder 60. This arrangement allows deflected ground coffee passing through filter chute to fall into filter holder 60.

Coffee maker 10 preferably includes a funnel-shaped filter stabilizer 58 (FIG. 4) which both guides filter lid 54 onto filter holder 60 and prevents a filter paper placed in filter holder 60 from collapsing and blocking feed path 38. Filter stabilizer 58 is designed to loosely engage filter cover 54 via coupling between hooks 72 and slots 70. Filter cover 54 has a concentric flange 57 with slots 70 which mates with male hooks 72 (extend from the top rim of filter stabilizer 58). When engaged, filter stabilizer 58 hangs loosely from filter lid 55. When filter lid 55 and filter stabilizer 58 are then initially secured onto filter holder 60 holding a filter paper, the hanging filter stabilizer 58 adjusts in such a manner that the bottom rim pins the filter paper against the interior surface of filter holder 60. As a result, the filter paper is prevented from collapsing. When filter lid 55 is finally secured onto filter holder 60, the pinning rim of filter stabilizer 58 drags the top portion of the filter paper downwards and prevents the filter paper from blocking feed path 38.

In summary, the present invention comprises a coffee grinder and maker which has means for channeling hot water to a filter unit and for preventing the escape of steam resulting from a brew action. A valve prevents the discharge of hot water should water be added to the coffee maker while the heater is still hot. An interlock means prevents the operation of the coffee grinder and maker, unless the water channeling and grinder cover are in place.

The invention having thus described with particular reference to the preferred forms thereof, it will be obvious that various changes and modifications may be made therein without departing from the spirit and scope of the invention as defined in he appended claims.

I claim:

1. A coffee maker comprising:
   (a) a water reservoir;
   (b) a heater connected to said water reservoir for providing a hot water source;
   (c) a conduit operatively connected to said hot water source;
   (d) a filter holder for holding a coffee filter and a quantity of coffee;
   (e) a condensate chamber for channeling steam condensate to said water reservoir; and
   (f) fluid distribution means operatively connected between said conduit, said filter holder and said condensate chamber, said fluid distribution means comprising a flow chamber and a filter cover for coupling said filter holder to said flow chamber, and for:
      (i) channeling hot water from said conduit to said filter holder,
      (ii) collecting and condensing, via said filter cover and flow chamber, steam produced during a brew action from at least said filter holder, and
      (iii) channeling steam condensate to said condensate chamber.

2. The coffee maker recited in claim 1, wherein said flow chamber comprises:
   a molded, plastic, hollow chamber having fittings for mating with said conduit, said cover means and said condensate chamber; and said molded, plastic, hollow chamber includes:
      (i) a first passage between said conduit and said cover means,
      (ii) a second passage between said cover means and said condensate chamber, and
      (iii) a barrier between said first passage and said second passage for preventing liquid flow between said first passage and second passage and for enabling gaseous flow between said first passage and said second passage.

3. The coffee maker recited in claim 2, wherein said flow chamber further condenses steam into steam condensate, i.e., water.

4. The coffee maker recited in claim 1, wherein said condensate chamber comprises a receptacle operatively connected between said fluid distribution means and said water reservoir for directing steam condensate into said water reservoir.

5. The coffee maker recited in claim 4, wherein said condensate chamber is located inside said water reservoir and wherein a bottom end of said receptacle opens out into said water reservoir, thereby allowing steam condensate to return to said water reservoir.

6. The coffee maker recited in claim 1, further comprising valve means positioned in said conduit, having a normally closed condition for preventing the ejection of hot water therefrom when in the closed condition.

7. The coffee maker recited in claim 6, wherein said valve means comprises a spring-loaded valve means openable when contacted by a protrusion from said fluid distribution means, thereby actuating said valve means to an open position.

8. The coffee maker recited in claim 1, further comprising a filter paper stabilizer for preventing a filter paper placed into said filter holder from collapsing during a brew action.

9. The coffee maker as recited in claim 8, further comprising:
   (i) means for grinding coffee beans into coffee grounds;
   (ii) means for dispensing coffee grounds into said filter holder; and
   (iii) said filter stabilizer further preventing the filter paper from obstructing said means for dispensing coffee grounds into said filter holder.

10. The coffee maker recited in claim 8, wherein said filter paper stabilizer comprises a funnel shaped filter ring operatively connected to said cover means for pinning said filter paper against an interior surface of said receptacle when said cover means is engaged onto said filter holder.

11. The coffee maker recited in claim 10, wherein said filter ring has a ridged bottom rim for improved pinning of said filter paper against the interior surface of said filter holder.

12. The coffee maker recited in claim 10, wherein coffee filter stabilizer when engaged to said cover means hangs in a self-adjusting position.

13. The coffee maker recited in claim 1, further comprising safety interlock means for preventing an operation of said coffee maker when said fluid distribution means is not properly engaged between said conduit, said filter holder and said condensate chamber.

14. The coffee maker recited in claim 13, wherein said safety interlock means comprises a switch means having a normally opened condition, wherein said switch means is closed only if said fluid distribution means is properly engaged between said conduit, said filter holder and said condensate chamber.

15. The coffee maker in claim 14, wherein said switch means further comprises a spring-loaded plunger for closing said switch means when said plunger is contacted by a protrusion from said fluid distribution means.

* * * * *